United States Patent Office 3,406,224
Patented Oct. 15, 1968

3,406,224
NON-FLAMMABLE POLYETHYLENE
TEREPHTHALATE FILM
Leslie Marvin McDonough, Yakima, Wash., assignor to
E. I. du Pont de Nemours and Company, Wilmington,
Del., a corporation of Delaware
No Drawing. Filed Mar. 14, 1966, Ser. No. 533,819
6 Claims. (Cl. 260—860)

ABSTRACT OF THE DISCLOSURE

A non-flammable polyethylene terephthalate film is provided. The polyethylene terephthalate film is derived from a block copolymer of poly(2,2-bis 4-hydroxy dichlorophenyl propane pentaerythritol diphosphite) and polymeric linear terephthalate esters wherein the weight ratio of said polyphosphite to said polymeric linear terephthalic ester is between 10:90 and 40:60.

---

The present invention relates to a novel polymer and, more particularly, is directed to a novel block copolymer of a polymeric linear terephthalic ester and to a process of manufacture therefor.

Linear polyesters of terephthalic acid and ethylene glycol and higher polymethylene glycols containing up to 10 carbon atoms are well-known thermoplastic polymeric materials described in, for example, U.S. Patent 2,465,319. Polyethylene terephthalate prepared from terephthalic acid or a low molecular weight alkyl ester thereof and ethylene glycol is a particularly preferred product of the class of polyesters described in said aforementioned patent. It is also known to prepare shaped structures such as, for example, self-supporting films of such polyesters by extruding the molten polymeric material through a suitable orifice followed by quenching the amorphous polymeric material in film form. The polyester film is then molecularly oriented as by stretching or rolling the film in both of its major planar directions of length and width whereby to impart thereto greatly enhanced physical property levels such as vastly improved tensile strength. One serious drawback of said polyester film structures as polyethylene terephthalate is that they are combustible and will support a burning flame thus rendering such film structures unsuitable for special electrical applications such as wire cord covering, use in capacitors, transformers and other such electrical uses requiring non-flammable film structures. It is, therefore, the principal object of the present invention to provide a novel polymeric linear terephthalic ester characterized by improved flame retardancy.

According to the present invention, there is provided a block copolymer of the structure $(AB)_xA_y$ wherein A is a polymer segment of poly(2,2-bis 4-hydroxy dichlorophenyl propane pentaerythritol diphosphite), B is a polymer segment of a polymeric linear terephthalic ester, $x$ is a positive whole number of at least one, and $y$ is an integer of 0 through 1, wherein the weight ratio of A to B in said block copolymer ranges between 10:90 and 40:60.

According to the present invention, there is further provided a process for preparing a block copolymer which comprises reacting under anhydrous conditions between about 10% and about 40% by weight, based upon the total weight of the block copolymer of poly(2,2-bis 4-hydroxy dichlorophenyl propane pentaerythritol diphosphite) with between about 60% and about 90% by weight, based upon the total weight of the block copolymer, of a polymeric linear terephthalic ester, at a temperature between about 275° C. and 290° C. for a period of time between about 1 minute and about 10 minutes.

The nature and advantages of the block copolymer and the process of the present invention will be more clearly understood from the following description thereof.

The block copolymer of the present invention is derived from a polymeric linear terephthalic ester and poly-(2,2-bis 4-hydroxy dichlorophenyl propane pentaerythritol diphosphite). A preferred polymeric linear terephthalic ester is polyethylene terephthalate, and while the present invention is described and exemplified hereinafter with particular reference to polyethylene terephthalate, it is to be understood that the invention is not limited thereto and comprehends other polyesters. By polyester is meant a linear polyester which contains the recurring structural formula:

—O—G—OOC—T—CO— wherein —G— represents a divalent organic radical containing from 2 to 10 carbon atoms and attached to the adjacent oxygen atoms by saturated carbon atoms. Thus, the symbol —G— can be of the form —$CH_2$—$Z_mCH_2$—, where $m$ is 0 or 1 and Z represents an alkylene radical, a cycloalkylene radical, a bis-alkylene ether radical, or other suitable organic radical. The symbol —T— represents a divalent aliphatic radical or aromatic radical. Thus, the symbol —T— can be of the form —$(CH_2)_n$—, wherein $n$ is greater than unity, or

and the like. The polyesters can be prepared by reacting a dicarboxylic acid or an ester-forming derivative thereof with a glycol, HO—G—OH, where —G— is a radical as defined above, to form the bis-glycol ester of a dicarboxylic acid, followed by polycondensation at elevated temperature and reduced pressure with elimination of excess glycol. Examples of suitable glycols include ethylene glycol, diethylene glycol, propylene glycol, butylene glycol, decamethylene glycol, neopentyl glycol, and trans-bis-1,4-(hydroxymethyl) cyclohexane. Mixtures of one or more such glycols can be used. Examples of suitable acids include adipic, sebacic, isophthalic, terephthalic, azelaic, maleic, bibenzoic and hexahydroterephthalic, 1,5-naphthalene dicarboxylic, 2,6-naphthalene dicarboxylic and 2,7-naphthalene dicarboxylic. The preferred polyesters are linear terephthalate polyesters where —T— in the above structural unit is

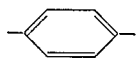

and wherein the polyester contains at least 50 molar percent of said structural units. Polycondensation catalysts may be utilized in the preparation of the polyester in the manner described in U.S. Patent 2,465,319.

The poly(2,2-bis 4-hydroxy dichlorophenyl propane pentaerythritol diphosphite) component of the block copolymer of the present invention is prepared from tetrachlorobisphenol A, diphenyl pentaerythritol diphosphite and diphenyl phosphite in the manner described in U.S. Patent 3,053,878. It is essential that the amount of poly(2,2-bis 4-hydroxy dichlorophenyl propane pentaerythritol diphosphite) in the block copolymer range between about 10% and about 40% by weight, based upon the total weight of the block copolymer. Amounts of poly(2,2-bis 4-hydroxy dichlorophenyl propane pentaerythritol diphosphite) below about 10% result in a block copolymer having a low and essentially unsuitable level of flame retardancy, while amounts of poly(2,2-bis 4-hydroxy dichlorophenyl propane pentaerythritol diphosphite) exceeding about 40% seriously reduce the level of crystallinity and the tensile properties of film structures formed from such block copolymers.

The block copolymer provided by the present invention is particularly useful in the form of thin films, fibers and filaments which may be formed by known techniques such as melt extrusion and, in the case of film structures, pressing. Films, fibers and filaments of the block copolymer of the present invention are characterized by a high level of flame retardancy.

The process provided by the present invention for preparing the block copolymer described above comprises reacting under anhydrous conditions between about 10% and about 40% by weight, based upon the total weight of said block copolymer of poly(2,2-bis 4-hydroxy dichlorophenyl propane pentaerythritol diphosphite) with between about 60% and about 90% by weight, based upon the total weight of said block copolymer, of a polymeric linear terephthalic ester, at a temperature between about 275° C. and 290% C. for a period of time between about 1 minute and about 10 minutes. In a preferred embodiment, the process of the invention comprises reacting between about 10% and about 20% by weight, based upon the total weight of the block copolymer, of poly(2,2-bis 4-hydroxy dichlorophenyl propane pentaerythritol diphosphite) with between about 80% and about 90% by weight of polyethylene terephthalate, at a temperature bewteen about 280° C. and 285° C. for a period of time of between about 1 and 10 minutes.

The poly(2,2-bis 4-hydroxy dichlorophenyl propane pentaerythritol diphosphite) and the polymeric linear terephthalic ester are preferably reacted together in a molten form in a conventional screw type extruder having a mixing zone wherein the two reactants are thoroughly blended together, reacted and thereafter immediately melt-extruded into shaped structures such as self-supporting films. This may be conveniently carried out by mixing the poly-(2,2-bis 4-hydroxy dichlorophenyl propane pentaerythritol diphosphite) and the polymeric linear terephthalic ester in solid form such as powder form or flake form and heating and reacting the mixture above the melting point of the ingredients thereof in the absence of substantial absence of air for a period of time between about 1 and about 10 minutes. In the preferred integrated process, the block copolymer formed is immediately melt-extruded into film form. The molten polymeric material may, of course, be pressed into film form by conventional melt-pressing techniques.

It is essential in the process of the present invention that the poly(2,2-bis 4-hydroxy dichlorophenyl propane pentaerythritol diphosphite) be maintained under anhydrous conditions until at least after it is reacted with the polymeric linear terephthalic ester, since the poly(2,2-bis 4-hydroxyl dichlorophenyl propane pentaerythritol diphosphite) is very hygroscopic and will decompose in the presence of water vapor to provide a product unsuitable in the present process.

It is also essential in the process of the present invention that the reactants be reacted for a period of time not exceeding 10 minutes at temperatures specified herein. A process reaction time exceeding or significantly greater than 10 minutes at the specified temperatures will cause the block copolymer rapidly to degrade. A process reaction time of at least 1 minute is necessary at the temperature specified herein in order to produce the desired block copolymer.

After formation of the block copolymer, the molten polymeric material is extruded or pressed into film form, and the film is then quenched, molecularly oriented as by stretching to an extent of about 3 times its original dimension in both the longitudinal and transverse directions thereof at a temperature of about 95° C., followed then by heat-setting for 2 minutes at 300° C.

The product of the foregoing reaction is a substantially crystalline block copolymer of the structure $(AB)_xA_y$ wherein A is a polymer segment of poly(2,2-bis 4-hydroxy dichlorophenyl propane pentaerythritol diphosphite), B is a polymer segment of a polymeric linear terephthalic ester, $x$ is a positive whole number of at least 1, $y$ is an integer of 0 through 1; the weight ratio of A to B in the block polymer being in the range between 10:90 and 40:60. Representative ratios of A to B are 40:60, 30:70, 20:80, 15:85, and 10:90.

The block copolymer of the present invention makes available polymeric linear terephthalate ester films which are not only flame resistant but which also possess physical properties which are equal, and in some cases superior, to conventional polyester films now commercially available. The films will find great use in applications which demand superior tensile, chemical and electrical properties of linear polyester films and which additionally require flame retardancy.

The principle and practice of the present invention will now be illustrated by the following examples which are provided to show the practice and use thereof, but it is not intended that the invention be limited thereto since modifications in technique and operation will be apparent to anyone skilled in the art.

The samples of block copolymers in film form prepared in the following examples were evaluated in accordance with the following testing procedures:

Tear strength is the force required to tear a film structure in either of its two major planar directions and is expressed in grams per mil of film thickness. In the examples herein the tear strength was measured on an Elmendorf tear tester. This device has a stationary jaw, a movable jaw mounted on a pendulum which swings on a frictionless bearing, and a means for measuring the maximum arc through which the pendulum swings. The film sample to be tested is secured at two of its ends between the jaws and the pendulum is released. The point at which the pendulum stops after tearing the film is recorded and the tear strength calculated therefrom.

High temperature durability.—Film clamps are affixed to both ends of a 5 inch by 1 inch film sample to be tested. The test film sample is cut from a specimen sheet of film so that the greater dimension thereof is in the machine direction, i.e., direction of extrusion, of the specimen sheet. The clamps are placed perpendicularly to the major axis of the rectangular test film sample thereby permitting it to hang straight and even. A weight is hung on each sample and the assembly is preheated in an oven for 30 minutes at a temperature of 125° C. The oven temperature is then increased to 220° C. and the test film sample is maintained in the oven at that temperature for an additional 30 minutes. The sample is then removed from the oven and the exposed portion of the sample cut from between the clamps. Each sample is flexed 180° C. The film sample should not exhibit brittleness and nor should the haze characteristic of the film be markedly increased. The weight attached to the test film sample varies according to the thickness thereof and is selected in accordance with the following table:

| Film thickness, mils | Weight (g.) | Clamp weight (g.) |
|---|---|---|
| 25–35 | None | 50 |
| 50–75 | 50 | 50 |
| 100 | 150 | 50 |
| 150 | 100 | 200 |
| 200 | 200 | 200 |
| 300 | 400 | 200 |
| 500 | 800 | 200 |
| 750 | 1,300 | 200 |
| 1,000 | 1,800 | 200 |

F5 is a measure of the tensile strength of a sample film structure at an elongation of 5% and is measured on an Instron testing machine (Model T–TB, Instron Engineering Co., Quincy, Mass.) using a sample having a length of 2 inches (between the jaws of the machine) and a width of 1 inch and elongating the sample at a rate of 100 percent per minute. The tensile strength at 5% elongation is expressed in terms of force per area based upon the cross-sectional area of the sample film. The F5 value of the film indicates stability and resistance to deformation due to sudden changes in tension applied thereto.

Elongation is the extent to which a film structure will stretch before breaking upon being subjected to unidirectional tension at room temperature at a constant rate of 100 percent per minute. Elongation is indicative of the flexibility of the polymeric film, and it is determined by elongating a test film sample in an Instron Tensile Tester at a rate of 100 percent elongation per minute until the test sample breaks.

Modulus is a measure of bend (elasticity) and stiffness and is expressed in p.s.i. It is measured on an Instron testing machine (Model T–TB, Instron Engineering Co., Quincy, Mass.). The modulus is calculated from a load-elongation chart produced by the machine and is expressed in terms of force per unit area based upon the cross-sectional area of the stretched film.

Tensile strength is the amount of pull (amount of load) or directional force, conveniently expressed in pounds per square inch (p.s.i.), which is required to break the film at room temperature. It, like the modulus, is calculated from the load-elongation chart produced by the Instron testing machine.

EXAMPLE 1

Ethylene terephthalate polymer (intrinsic viscosity 0.65) was ground to 20 mesh and dried at 120° C. over a 12-hour period in a vacuum oven. The dried flake was then introduced through a nitrogen-flushed feed bin into an injection port of a screw type mixer-extruder. Simultaneously, anhydrous poly(2,2-bis 4-hydroxy dichlorophenyl propane pentaerythritol diphosphite) ground to 20 mesh was introduced into the injection port through a second nitrogen-flushed feed bin. The mixer-extruder was maintained at a temperature of 275 to 285° C., and the two components were converted to molten form and allowed to react under a vigorous mixing action. After a hold-up time of between 1 and 5 minutes, the block copolymer was extruded into film form. The block copolymer film was quenched at 40° C. and then stretched first in its longitudinal direction to an extent of 3× (3 times its original dimension) at a temperature of 95° C. and then in its transverse direction to an extent of 3× at a temperature of 95° C., utilizing the stretching apparatus described in U.S. Patent 2,823,421. The film structure was then heat-set at a temperature of 200° C.

Following the procedure described above, molecularly oriented film structures were prepared from copolymers of polyethylene terephthalate and poly(2,2-bis 4-hydroxy dichlorophenyl propane pentaerythritol diphosphite) of the weight percent shown in Table 1 herebelow. The film samples were evaluated for flame retardancy by attempting to ignite the samples with the flame of a Bunsen burner. The results of the evaluation test are also listed in Table 1 herebelow. For purposes of comparison, Table 1 also contains a control sample, Sample F, of only polyethylene terephthalate and, as indicated therein, Sample F burns readily, in direct contrast to the other samples in Table 1.

TABLE 1.—FLAME RETARDANCY OF BLOCK COPOLYMERIC FILMS PREPARED FROM POLYETHYLENE TEREPHTHALATE AND POLY(2,2-BIS 4-HYDROXY DICHLOROPHENYL PROPANE PENTAERYTHRITOL DIPHOSPHITE)

| Sample | Weight percent polyethylene terephthalate | Weight percent poly(2,2-bis 4-hydroxy dichlorophenyl propane pentaerythritol diphosphite) | Flammability |
|---|---|---|---|
| A | 60 | 40 | None. |
| B | 70 | 30 | Do. |
| C | 80 | 20 | Do. |
| D | 85 | 15 | Do. |
| E | 90 | 10 | Self-extinguishing in less than 5 seconds. |
| F (control) | 100 | 0 | Self-supporting flame. |

EXAMPLES 2 AND 3

Following the procedure described in Example 1, molecularly oriented block copolymeric film structures of 10 to 15% by weight, based upon the total film weight, of poly(2,2-bis 4-hydroxy dichlorophenyl propane pentaerythritol diphosphite) and representing the preferred embodiment of the present invention, were prepared. Physical property measurements including (1) tensile properties such as modulus, $F_5$, tensile strength and elongation, (2) high temperature durability, and (3) tear strength were made on samples of the film structures. The test results are listed in Table 2 herebelow and these are compared with the physical property data of the control film structure of only polyethylene terephthalate.

TABLE 2.—PHYSICAL PROPERTY DATA FOR BLOCK COPOLYMERIC FILMS PREPARED FROM POLYETHYLENE TEREPHTHALATE AND POLY(2,2-BIS 4-HYDROXY DICHLOROPHENYL PROPANE PENTAERYTHRITOL DIPHOSPHITE)

| Example No. | Weight percent polyethylene terephthalate | Weight percent poly(2,2-bis 4-hydroxy dichlorophenyl propane pentaerythritol diphosphite) | Tensile properties [1] | | | | High temperature durability, °C. | Tear strength |
|---|---|---|---|---|---|---|---|---|
| | | | Tensile strength, PSI×10⁻³ | Modulus, PSI×10⁻³ | $F_5$, PSI×10⁻³ | Elongation, percent | | |
| 2 | 85 | 15 | 26 | 614 | 16 | 88 | 244 | 27.5 |
| 3 | 90 | 10 | 26 | 600 | 16 | 96 | 244 | 37.5 |
| Control | 100 | 0 | 26 | 550 | 15 | 110 | 230 | 15 |

[1] Average of longitudinal and transverse direction values.

What is claimed is:

1. A block copolymer of the structure $(AB)_xA_y$ wherein A is a polymer segment of poly(2,2-bis 4-hydroxy dichlorophenyl propane pentaerythritol diphosphite), B is a polymer segment of polymeric linear terephthalic ester, $x$ is a positive whole number of at least one, and $y$ is an integer of 0 through 1, wherein the weight ratio of A to B in said block copolymer ranges between 10:90 and 40:60.

2. The block copolymer of claim 1 wherein the polymeric linear terephthalic ester is polyethylene terephthalate.

3. The block copolymer of claim 1 wherein the weight ratio of A to B is 20:80.

4. A process for preparing a block copolymer which comprises reacting under anhydrous conditions between about 10% and about 40% by weight, based upon the total weight of the block copolymer of poly(2,2-bis 4-hydroxy dichlorophenyl propane pentaerythritol diphosphite) with between about 60% and about 90% by weight, based upon the total weight of the block copolymer, of a polymeric linear terephthalic ester, at a temperature between about 275° C. and 290° C. for a period of time between about 1 minute and about 10 minutes.

5. The process of claim 4 wherein the polymeric linear terephthalic ester is polyethylene terephthalate.

6. The process of claim 4 wherein 20% by weight of poly(2,2-bis 4-hydroxy dichlorophenyl propane pentaerythritol diphosphite) is reacted with 80% by weight of a polymeric linear terephthalic ester.

References Cited

UNITED STATES PATENTS

| | | | |
|---|---|---|---|
| 2,623,031 | 12/1952 | Snyder | 260—860 |
| 2,692,248 | 10/1954 | Lincoln | 260—42 |
| 3,053,795 | 9/1962 | Coover et al. | 260—860 |
| 3,053,878 | 9/1962 | Friedman et al. | 260—967 |
| 3,265,762 | 9/1966 | Quisenberry | 260—860 |
| 3,321,553 | 5/1967 | Boyer et al. | 260—862 |
| 3,331,890 | 7/1967 | Caldwell et al. | 260—860 |

MURRAY TILLMAN, *Primary Examiner.*

J. T. GOOLKASIAN, *Assistant Examiner.*